July 5, 1949.  G. V. WOODLING  2,474,880
CONNECTING DEVICE

Filed Feb. 26, 1944  2 Sheets-Sheet 1

INVENTOR.
George V. Woodling

July 5, 1949.   G. V. WOODLING   2,474,880
CONNECTING DEVICE

Filed Feb. 26, 1944   2 Sheets-Sheet 2

INVENTOR.
George V. Woodling

Patented July 5, 1949

2,474,880

UNITED STATES PATENT OFFICE 2,474,880

CONNECTING DEVICE

George V. Woodling, Cleveland, Ohio

Application February 26, 1944, Serial No. 523,961

7 Claims. (Cl. 285—86)

My invention relates in general to connecting devices and more particularly to connecting devices for tube fittings, cylinders and cables.

The invention is not limited to tube fittings, cylinders and cables but includes any application where a substantially round element is connected to another element.

An object of my invention is the provision of connecting a substantially round element to a coupling element by employing contractible means for annularly engaging the outer surface of the round element.

Another object of my invention is the provision of anchoring or connecting a tube to a coupling element whereby the vibration of the tube is absorbed.

Another object of my invention is the provision of compressible or contractible means for engaging the tube at a point or place remote from the flared end of the tube which is pressed against the abutting end of the coupling element, whereby vibrations or shocks subjected to the tube are not carried over to the flared end of the tube.

Another object of my invention is the provision of the contractible means which not only engages the tube but which also functions as an element for pressing the flared end of the tube against the abutting end surface of the coupling element.

Another object of my invention is the provision of a plurality of cup-shaped washers which act as a contractible means for engaging the substantially round element.

Another object of my invention is the provision of employing a mass of deformable and substantially non-compressible material as contractible means to engage the substantially round element.

Another object of my invention is the provision of employing a mass of deformable and substantially non-compressible material to force an anchoring element into the substantially round element.

Another object of my invention is the provision of employing a mass of deformable and substantially non-compressible material as a seal while at the same time employing it as means for transmitting a force to an anchoring element which anchors the substantially round element to a surrounding element.

Another object of my invention is the provision of a split washer or an anchoring element having a sharp inner edge which digs into the substantially round element, taken in combination with means for providing an annular groove next to the sharp edge whereby the material displaced by the sharp edge may flow into the adjacently disposed groove.

Another object of my invention is the provision of anchoring a cable to a coupling element by contractible means.

Other objects and a fuller understanding of my invention may be had by referring to the following description and claims, taken in conjunction with the accompanying drawing, in which:

Figure 1:
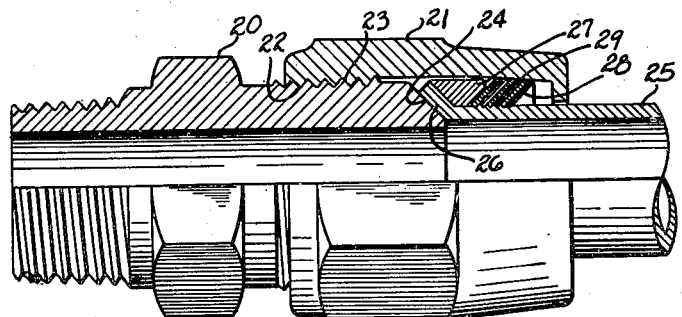
Figure 1 is a longitudinal cross-sectional view of a tube fitting embodying the features of my invention.
Figure 7:
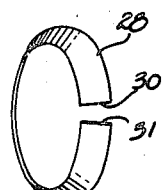
Figure 7 is a perspective view of a cup-shaped washer employed in the fittings.

With reference to Figure 1 of the drawing, my invention is shown as being applied to a tube fitting comprising a coupling element 20, a tube 25 adapted to be connected thereto, and a compression nut 21. The right-hand end of the coupling element 20 is provided with a bevelled abutment end 24 against which a flared end 26 of the tube is tightly pressed by means of a collar 27 which surrounds the tube. The compression nut 21 has an internal conical surface 29 spaced from the tube and defined in combination with the tube an annular tapering space to which is mounted a plurality of cup-shaped washers 28. The cup-shaped washers are closely nested within the annular tapering space with their inner edges 33 engaging the tube and with the outer edges 32 engaging the internal conical surface 29 of the compression nut. The collar 27 has upon the left-hand side thereof a conical surface to engage the flared end of the tube and has upon the other side thereof a conical surface in the reverse direction to provide a surface against which the cup-shaped washers exert a force. The Figure 7 shows a single cup-shaped washer and is provided with two open ends 30 and 31.

As the female threads 23 of the compression nuts are screwed upon the male threads 22 of the coupling element, the internal conical surface 29 of the compression nut engages the outer edges 32 of the washers and gradually causes the washer to contract as a contractible unit about the tube 25. As the compression nut 21 is turned on tighter, the cup-shaped washers continue to contract until the two ends 31 and 31 come together, at which point the washers become substantially solid. Consequently, further tightening of the compression nut 21 on the coupling element 20 causes the cup-shaped washers to function as a solid unit for pressing the collar 27 against the flared end 26 of the tube for making a good seal between the flared end 26 of the tube and the bevelled abutment end 24 of the coupling element 20. The cup-shaped washers engage the tube at a place remote from the flared end and thereby absorb vibration and fluid shocks, relieving the flared end 26 of the tube from such shock and vibration which would otherwise be damaging. It is to be observed that the split washers contract a limited amount until the open ends 30 and 31 come together for engaging the tube, after which the washers become substantially solid for pressing the collar 27 against the flared end of the tube.

Figure 4:
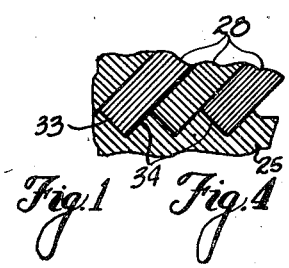
Figure 4 is a still further enlarged view showing the washers digging into the tube.
Figures 2, 3:
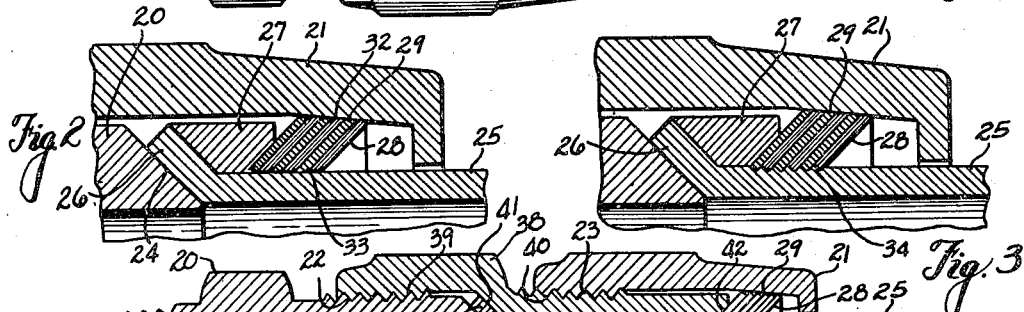
Figure 2 is an enlarged fragmentary view of Figure 1, showing the manner in which the inner and outer edges of the cup-shaped washer are crushed down.
Figure 3 is a view similar to Figure 2, but shows cup-shaped washers where the inner edges thereof dig into the tube.

In Figure 2 I show the outer and inner edges of the washer 28 crushed downwardly as they would be in the event that the washers are made of crushable or relatively soft material. The soft washers may be constructed of phenolic laminated products or phenol condensation products, of fibrous or plastic or synthetic material. The washers may also be made of metal or hard material. In Figure 3 I show the washer made of hard material which has the property of digging into the tube. The hard material may comprise heat treated metal. In Figure 3, the outer edges 32 of the washer may be shaped so that they are substantially flat against the inner conical surface 29 of the compression nut 21. The inner edges 33 are sharp and as they dig into the outside surface of the tube, the displaced metal is permitted to flow into the V-shaped annular groove 34 provided by the adjacently disposed side washers. So long as the displaced material has only a limited place to flow into such, for example, in the annular grooves 34 provided by the next adjacently disposed washers, then the outer surface of the tubes will not "skin off" when a strong pulling force is applied thereto. In other words, a small indenture will hold a considerable amount of longitudinal force provided the displaced metal has a limited space to flow into. When all of the annular V-shaped grooves 34 become completely filled as shown in Figures 3 and 4, then a good strong gripping action is provided.

Figure 5:
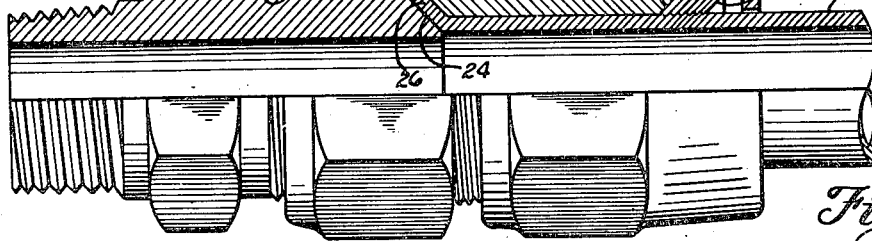
Figure 5 is a view of a modified fitting embodying the features of my invention.

In Figure 5 I show a tube fitting of a modified form in that I employ a collet nut 38 having female threads 39 for threadably engaging the male threads 22 of the coupling element 20. The collet nut 39 has an internal bevelled shoulder 41 for engaging the flared end 26 of the tube for pressing same tightly against the bevelled abutment end 24 of the coupling element 20. The compression nut 21 is arranged to have its female thread 23 threadably engage male threads 40 on the collet nut 38, whereby the compression nut 21 may be employed to compress the plurality of cup-shaped washers 28 about the tube 25 in the same manner as that previously described. The right-hand end of the collet nut 38 is provided with a conical abutment 42 against which the cup-shaped washers 28 engage.

Figure 6:
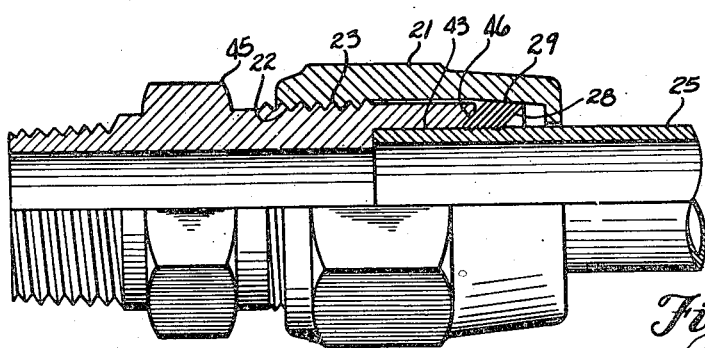
Figure 6 is another view constituting a modified form of my invention.

In Figure 6 I show a modified form of my invention in that the tube 25 has no flared end and the entire connection is effected by the cup-shaped washer 28. In this invention, the coupling element 45 is arranged to have an enlarged end bore 43 to receive the end of the tube 25. The right-hand end of the coupling element 45 is provided with a conical abutment 46 against which the plurality of cup-shaped washers engage. As the compression nut 21 is threadably turned onto the coupling element 45, the washers which have sharp inner edges and which are made of hard material dig into the outer annular surface of the tube 25. As previously explained, the displaced metal caused by the sharp edges digging into the tube flows into the adjacently disposed V-shaped grooves, after which the connnection will withstand a considerable amount of longitudinal force because the outer surface of the tube will not "skin off" since there is only a limited amount of space for the displaced metal to flow into. The outer edges 32 of the split washer may be made substantially flat to engage the internal conical surface 29 of the compression nut 21 so as to provide a good seal.

Figure 8:
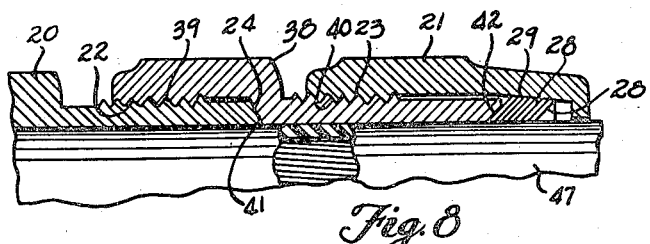
Figure 8 is a view of a rubber covered cable held by my device.

Figure 8 shows the cup-shaped washers 28 engaging a rubber covered cable 47. The washers contract about the rubber-like covering of the cable to make a good seal. The cable extends through the coupling and may then be connected to a terminal or head of an electrical device.

Figure 9:
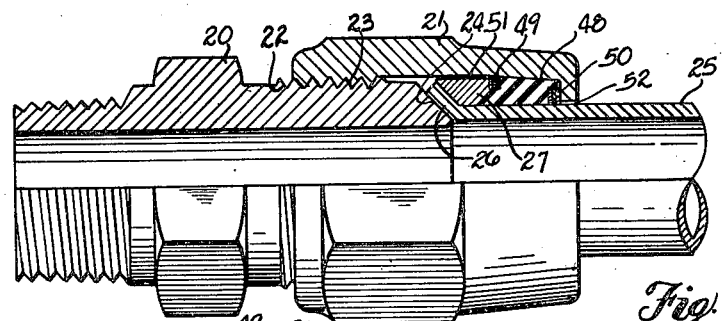
Figure 9 is a view similar to Figure 1 but shows a mass of deformable and substantially non-compressible material to take the place of the cup-shaped washers.
Figure 10:
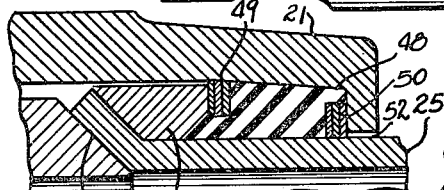
Figure 10 is a fragmentary and enlarged view of the mass of deformable and substantially non-compressible material of Figure 9.

In Figures 9 and 10 which are views corresponding substantially to Figures 1 and 2 I employ a mass of rubber-like material 48 instead of the split washers 28 to hold the tube. The mass of rubber-like material may be in the form of an endless ring and is relatively soft and thus deformable and substantially non-compressible. The clearance 51 between the collar 27 and the inside surface of the compression nut 21 is blocked off by non-extrusion, flat split washers 49. The clearance 52 between the right-hand end of the compression nut 21 and the tube 25 is blocked off by non-extrusion, flat split washers 50. The split washers may be made of any suitable plastic or composition material or metal and have their split openings so displaced circumferentially with respect to each other that the soft mass of rubber-like material 48 cannot flow through the washers.

As the compression nut is turned upon the coupling element 20, the mass of rubber-like material 48 is tightly compressed against the outside surface of the tube to absorb the shocks and vibrations transmitted to the tube which in turn relieves the flared end of the tube from strain. The non-extrusion split washers 49 and 50 completely block the extrusion of the soft rubber-like material through the clearance 51 and 52 with the result that the soft rubber-like material is tightly compressed around the outer surface of the tube. The non-extrusion split washers 49 and 50 are radially compressed by the deformable rubber so that all possible escape of the soft rubber is precluded. The split between the ends of the split washers is substantially closed when compressed by the rubber-like material so that the soft rubber-like material cannot escape through the clearance.

Figure 11:
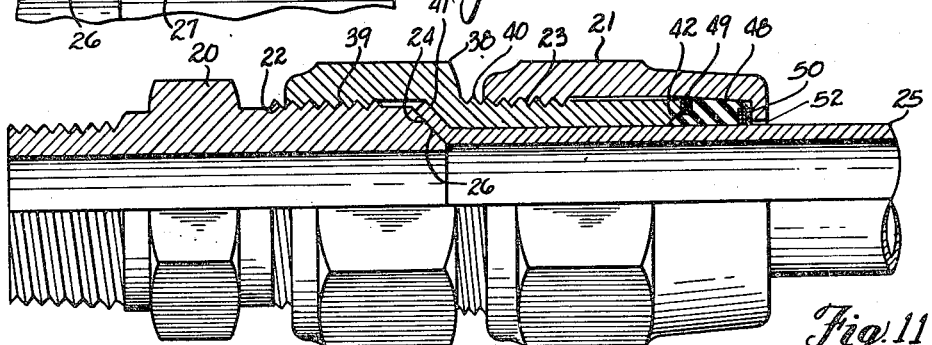
Figure 11 is a view similar to Figure 5, but shows the mass of deformable and substantially non-compressible material to take the place of the cup-shaped washers.

The Figure 11 is substantially the same as Figure 5 but shows the mass of rubber-like material 48 employed instead of the split washers 28 to hold the tube and the action of the soft rubber in Figure 11 is substantially the same as that described with reference to Figures 9 and 10.

Figure 12:
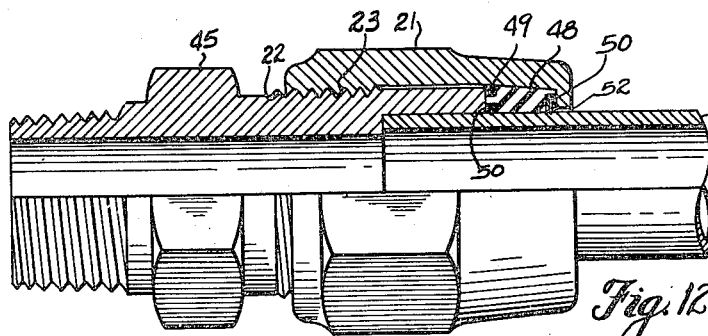
Figure 12 is a view like Figure 6, but shows the deformable and substantially non-compressible material to take the place of the cup-shaped washers.
Figure 13:
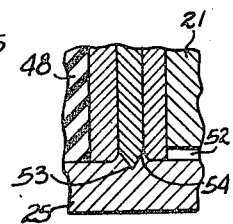
Figure 13 is an enlarged view of the non-extrusion split washers of Figure 12 with the center one digging into the tube.
Figure 14:
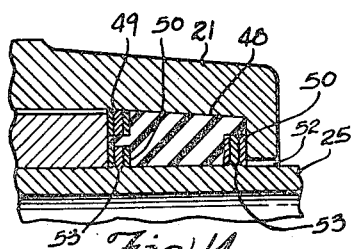
Figure 14 is an enlarged fragmentary view showing the deformable and substantially non-compressible material of Figure 12.

The Figure 12 is substantially the same as Figure 6 except that the mass of soft rubber-like material 48 is substituted for the split washers. In Figure 12, however, the set of non-extrusion split washers 50 has its intermediate one provided with a sharp cut edge 53 which digs into the tube 25. The two side non-extrusion split washers have their inner side corners removed to provide annular grooves 54 constituting limited spaces for the displaced metal to flow, see Figures 13 and 14 which are enlarged views thereof. The units in Figures 12 and 14 have two sets of non-extrusion split washers 50 in which the center split washer has a sharp inner edge for digging into the tube and in which the two side split washers have their inner edge corner removed to provide annular grooves 54 to receive the displaced metal caused by the sharp cutting edge digging into the tube. As the compression nut 21 is turned upon tightly, the mass of soft pliable rubber-like material forces the center non-extrusion split washer which has the sharp inner edge into the tubes for holding the tube against longitudinal movement. The outer surface of the tube 25 will not "skin off" since the displaced metal has a limited amount of space provided by the annular grooves 54 to flow into. The soft light rubber also provides a good seal between the tube and the compression nut 21.

Figure 15:
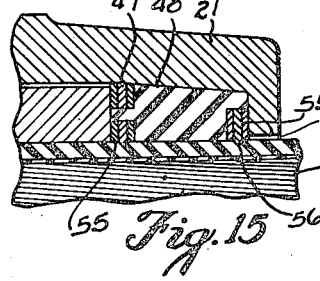
Figure 15 is a view similar to Figure 8, but shows the mass of deformable and substantially non-compressible material to take the place of the washers to hold the rubber cable.

The figure 15 is similar to Figure 8, but the mass of soft pliable rubber-like material 48 takes the place of the cup-shaped washers. The two sets of non-extrusion washers 55 have a center one provided with a round inner edge 56 which projects into the rubber coating on the cable.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device for attaching a tube having a flared end to a fitting element having threads and an abutting end surface against which the flared end of the tube engages, said device comprising a hollow member adapted to fit around the tube and having threads to engage the threads on the fitting element for securing said member to said fitting element, said hollow member having an internal conical surface radially spaced from the tube and defining an annular tapering space with the small end thereof spaced the most remote from the flared end of the tube, a plurality of split cup-shaped washers closely nested in said annular tapering space, the inner edge surfaces of said cup-shaped washers closely fitting around the tube at a place remote from the flared end of the tube and absorbing vibration, said internal conical surface of the hollow member engaging the outer edge surfaces of the said cup-shaped washers and forcing the washers toward the flared end of the tube to tightly press the flared end of the tube against the abutting end surface of the fitting element and abutment means for supporting the split washers and constraining same to contract in substantially a fixed transverse direction.

2. A device for attaching a tube having a flared end to a fitting element having threads and an abutting end surface against which the flared end of the tube engages, said device comprising a hollow member adapted to fit around the tube and having threads to engage the threads on the fitting element for securing said member to said fitting element, first means in the hollow member to engage the flared end of the tube and press same tightly against the abutting end surface of the fitting element, second means in the hollow member for engaging the tube at a place remote from the flared end of the tube to absorb vibration, said hollow member engaging said second means and forcing same against the first means, whereby said first means presses the flared end of the tube against the abutting end surface of the fitting element, said hollow member having an internal conical surface radially spaced from the tube and defining an annular tapering space with the small end thereof spaced the most remote from the flared end of the tube, said second means comprising a plurality of split cup-shaped washers having their inner edge surfaces closely fitting around the tube and having their outer edge surfaces fitting against the internal conical surface of the hollow member, the ends of the split washers which define the split moving toward each other as the hollow member is threadably turned on the fitting element, said ends upon contacting each other limiting the contraction of the split washers about the tube and abutment means for supporting the split washers and constraining same to contract in substantially a fixed transverse direction.

3. A device for attaching a first element to a second element, said first element being substantially round in cross-section and said second element having abutment means associated therewith, said device comprising a hollow member adapted to fit around the first element, means for drawing said hollow member toward said second element and securing same thereto, said hollow member having an internal conical surface radially spaced from the first element and defining an annular tapering space with the small end thereof spaced the most remote from the second element, a plurality of split cup-shaped washers closely nested in said annular tapering space, the inner edge surfaces of said cup-shaped washers closely fitting around the first element, said internal conical surface of the hollow member engaging the outer edge surfaces of the cup-shaped washers and forcing the washers against the abutment means and transmitting a force to the second element, said inner edge surfaces of said cup-shaped washers being sharp and digging into the first element and holding same securely to the second element and abutment means for supporting the split washers and constraining same to contract in substantially a fixed transverse direction.

4. A device for attaching a round element to a second element, said device comprising a hollow member adapted to fit around the round element, means for drawing said hollow member towards said second element and securing same thereto, said hollow member having an internal conical surface radially spaced from the round element and defining an annular tapering space, a plurality of split cup-shaped washers closely nested in said annular tapering space, the inner edges of said cup-shaped washers closely fitting around the round element, said internal conical surface of the hollow member engaging the outer edges of the cup-shaped washers and contracting the washers about the round element.

5. A device for attaching a round element to a second element, said device comprising a hollow member adapted to fit around the round element, means for drawing said hollow member towards said second element and securing same thereto, said hollow member having an internal surface radially spaced from the cable and defining an annular space, a mass of deformable and substantially non-compressible material in the annular space and engaging the round element, non-extrusion blocking means in the annular space engaging the round element to prevent extrusion of the said mass material from the annular space, said blocking means being movable against the round element by pressure from the said mass material.

6. A device for attaching a first element to a second element, said first element being substantially round in cross-section and said second element having abutment means associated therewith, said device comprising a hollow member adapted to fit around the first element, means for drawing said hollow member toward said second element and securing same thereto, said hollow member having an internal surface radially spaced from the first element and defining an annular space, means including at least a split washer in the annular space and engaging the first element, and means urging the said at least a split washer against the first element upon longitudinal movement of the hollow member towards said second element, said abutment means supporting the split washer and constraining same to contract in substantially a fixed transverse direction.

7. A device for attaching a first element to a second element, said first element being substantially round in cross-section and said second element having abutment means associated therewith, said device comprising a hollow member adapted to fit around the first element, means for drawing said hollow member toward said second element and securing same thereto, said hollow member having an internal surface radially spaced from the first element and defining an annular space, yieldable means composed of substantially non-compressible material in said annular space and engaging both the first element and the internal surface of the hollow member, said yieldable means comprising a split washer and being radially contractable and subject to reaction between said first element and said internal surface and pressing radially against the first element upon longitudinal movement of the hollow member towards said second element, said abutment means supporting the split washer and constraining same to contract in substantially a fixed transverse direction.

GEORGE V. WOODLING.

REFERENCES CITED

The following references are of record in the file of this patent:

UNITED STATES PATENTS

| Number | Name | Date |
|---|---|---|
| 411,829 | Machtrieb | Oct. 1, 1889 |
| 2,116,299 | Bannister | May 3, 1938 |
| 2,251,715 | Parker | Aug. 5, 1941 |
| 2,269,629 | Kreidel | Jan. 13, 1942 |
| 2,320,812 | Cowles | June 1, 1943 |
| 2,320,813 | Cowles | June 1, 1943 |
| 2,341,164 | Shimek | Feb. 8, 1944 |

FOREIGN PATENTS

| Number | Country | Date |
|---|---|---|
| 548,026 | Germany | Oct. 7, 1930 |